United States Patent
McDowell et al.

(10) Patent No.: US 9,015,433 B2
(45) Date of Patent: Apr. 21, 2015

(54) RESILIENCY WITH A DESTINATION VOLUME IN A REPLICATION ENVIRONMENT

(75) Inventors: Jonathan Andrew McDowell, San Francisco, CA (US); Siamak Nazari, Mountain View, CA (US); Richard T. Dalzell, Belfast (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 177 days.

(21) Appl. No.: 13/563,223

(22) Filed: Jul. 31, 2012

(65) Prior Publication Data

US 2014/0040574 A1    Feb. 6, 2014

(51) Int. Cl.
*G06F 12/16* (2006.01)
*G06F 3/06* (2006.01)
*G06F 11/14* (2006.01)

(52) U.S. Cl.
CPC .............. *G06F 3/0647* (2013.01); *G06F 3/061* (2013.01); *G06F 3/0619* (2013.01); *G06F 3/067* (2013.01); *G06F 11/1446* (2013.01)

(58) Field of Classification Search
CPC ........................... G06F 3/0647; G06F 11/1446
USPC .................................................. 711/161, 162
See application file for complete search history.

(56) References Cited

U.S. PATENT DOCUMENTS

| | | | |
|---|---|---|---|
| 6,772,303 B2 | 8/2004 | Crockett et al. | |
| 7,293,154 B1 | 11/2007 | Karr et al. | |
| 8,423,731 B1* | 4/2013 | Nadathur et al. | 711/162 |
| 2006/0236056 A1 | 10/2006 | Nagata | |
| 2009/0193206 A1* | 7/2009 | Ishii et al. | 711/162 |
| 2011/0231698 A1* | 9/2011 | Zlati et al. | 714/3 |

OTHER PUBLICATIONS

Symantec Corporation, "Veritas Storage Foundation(TM) by Symantec, Heterogeneous Online Storage Management," Data Sheet: Storage Management, pp. 1-6 (2006).
TechTarget, "Data Migration Product Specifications," SearchStorage, pp. 17, (Jan. 2008), Retrieved: <http://searchstrorage.techtarget.com/tutorial/Data-migration-product-specifications>.

* cited by examiner

*Primary Examiner* — Than Nguyen
(74) *Attorney, Agent, or Firm* — Dicke, Billig & Czaja, PLLC

(57) ABSTRACT

A method to provide resiliency with a destination volume in a replication environment is disclosed. Data from a source volume, such as a primary volume or a secondary volume in a replication relationship, is migrated to the destination volume. A snapshot representing data on a source volume is generated. The replication relationship between the source volumes is broken, and a new relationship between a source volume and the destination volume is established. A delta of data between the snapshot and one of the volumes in the new relationship is generated. The delta is sent to the other of the volumes in the new relationship.

16 Claims, 4 Drawing Sheets

RESILIENCY WITH A DESTINATION VOLUME IN A REPLICATION ENVIRONMENT

BACKGROUND

In data storage technology, data replication is the process of copying specified content from a primary storage system to a secondary, or backup, storage system. The secondary storage system can be located on the same site as the primary storage system, but it is often remote from the primary storage system. For example, the primary storage system may be located across country or across the world from the secondary storage system. Data replication is achieved through an initial transfer of the specified data often using standard data migration techniques. After the initial transfer, the backup storage system is kept updated with the primary storage system with any changes that are made to the data in the primary storage system. The backup storage system provides for redundancy and quick recovery of systems in case of a catastrophic failure of the primary storage system.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

Figure 1:
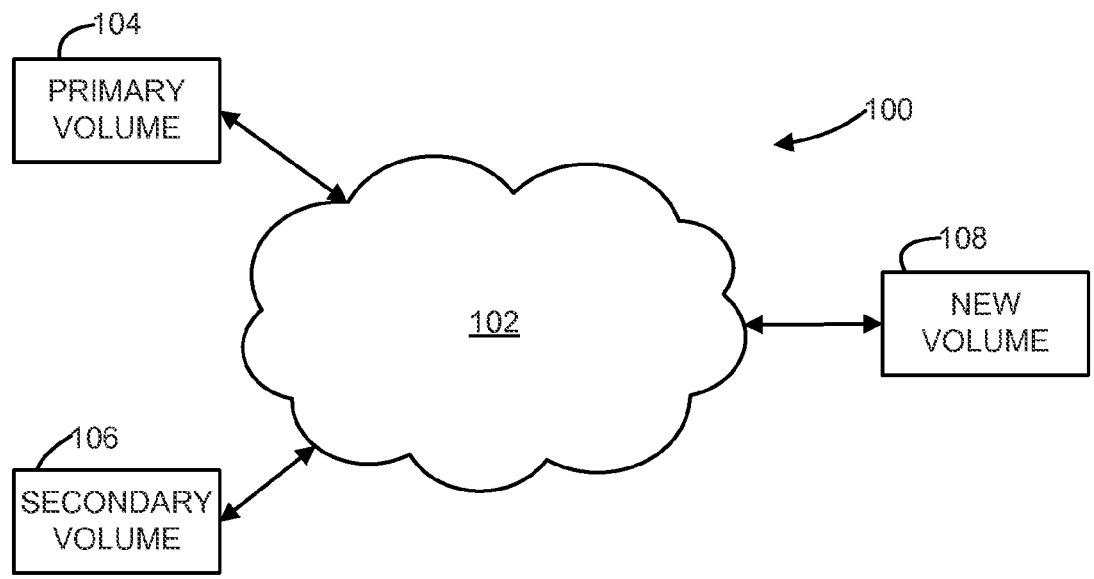
FIG. 1 is a schematic diagram illustrating an example of replication environment on a computer network.

FIG. 1 illustrates an example replication environment 100 used to perform data replication over a network 102 such as a local area network, a wide area network, the Internet, a storage area network, or other network. Data replication is the process of copying specified, block-device level content from one computing device, i.e., the source device, to another, i.e., the destination device. This is achieved through an initial transfer of the specified data, or initial sync. In one example, the source device includes a primary volume 104 and on the destination device includes a secondary, or backup, volume 106, and the primary volume 104 is in a replication relationship with the secondary volume 106 over the network 102. After the initial transfer, the secondary volume 106 is kept updated with the primary volume 104 in nearly real time with any changes that are made to the data in the primary volume 104. The replicated data on the secondary volume 106 provides on-going, nearly real-time disaster recovery protection for the primary volume 104, which can be referred to as resilience. Additionally, data replication provides a basis for other data protection activities, such as recovery points, or snapshots, and backups of snapshots.

Several replication configurations can be used in the replication environment 100. Replication environment 100 can include a fundamental configuration for data replication where a single primary volume 104 on the network 102 has its data replicated to a single secondary volume 106, which can be either local or remote to the primary volume 104. This provides real-time resiliency of the primary volume 104 against catastrophic failure. Still another configuration includes a fan-out configuration where a primary volume, such as primary volume 104 has its data replicated to multiple secondary volumes on the network 102. The fan-out configuration provides resiliency against catastrophic failure of the primary volume as well as catastrophic failure of some of the multiple secondary volumes. Other configurations are contemplated.

FIG. 1 also illustrates a new volume 108 coupled to the network 102, such as a new storage array. The new volume 108 can be a volume already existing on the network 102 or one that has been recently introduced into the replication environment 100 to establish another primary volume 104 or the secondary volume 106. In one example, the new volume 108 is employed to replace the primary volume 104 or the secondary volume 106. Typically the process of setting up a new replication relationship with the new volume 108 involves a full initial sync of the primary volume 104 or the secondary volume 106, i.e., a source volume, to the new volume 108, i.e., a destination volume, where all of the data from the source volume is sent to the remote destination volume. When data migration techniques are used to move the source volume to the destination volume, there is a period of time after the migration is complete where the data on the primary volume 104 is no longer remotely replicated on the secondary volume 106 until a new replication relationship is configured with the new volume 108. Data written to the primary volume 104 after migration is complete is not replicated until the new relationship is configured. During this period, data is not protected.

Several solutions attempt to address the concern of unprotected data after migration completes. One solution provides for a full initial sync to re-establish resilience after the migration to the new volume completes. This solution, however, introduces other protection concerns because it results in an extended reduction in resilience until migration completes. Another solution offers the ability to perform a full initial sync before migration completes. This solution, however, increases the length of time taken to perform the migration. This solution also results in duplication of resilience during the migration process, and involves twice the space on the replication secondary, and twice the amount of bandwidth in the relationships to keep the replication current until migration is complete. Thus, previous methods to address the concern of unprotected data result in extended migration time, increased overhead, increased use of bandwidth, or some combination of these drawbacks.

This disclosure presents an approach that makes use of snapshots to provide a checkpoint of the volume state that matches between the primary volume 104, the secondary volume 106 and the new volume 108. The consistent checkpoints across the volumes allow for a reduced minimal delta resynchronization of a delta, which includes the changes to the source volumes 104 or 106 during the time from when migration completes to when a new replication relationship is established with the new volume 108. The approach reduces the amount of time to return to full data replication resilience, as well as reduces the amount of data to be transferred, and thus the amount of bandwidth employed, to reestablish resilience than the previous methods described above.

Figure 2:
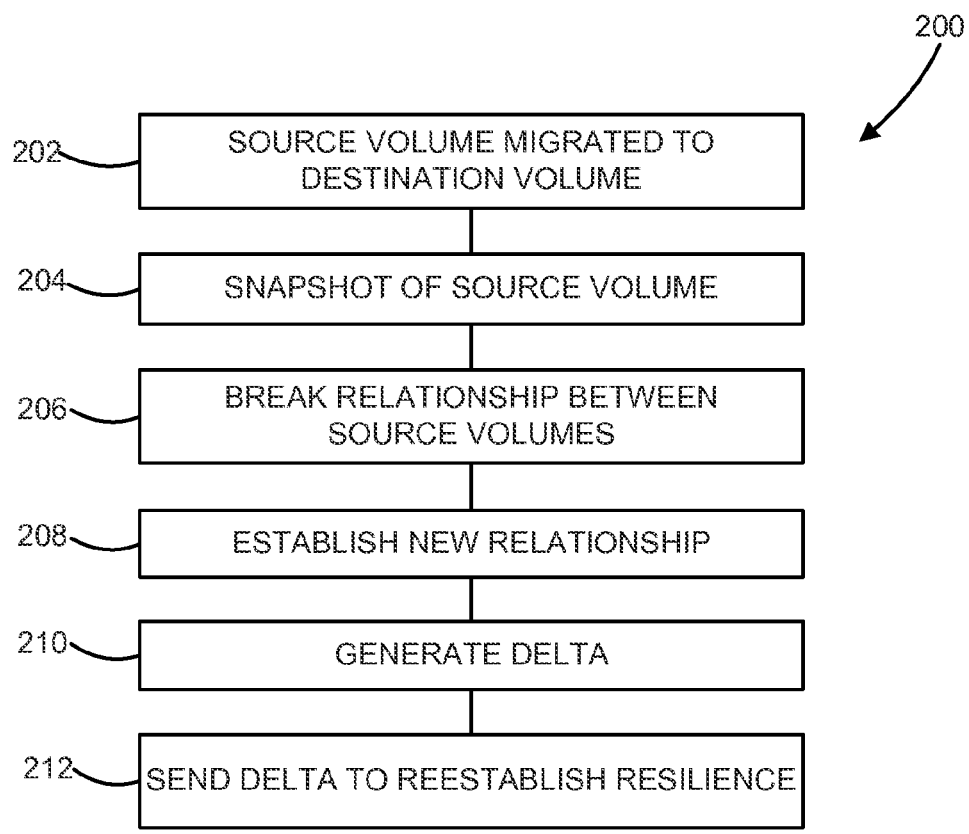
FIG. 2 is a block diagram illustrating an example of a method for providing resiliency with a destination volume in the replication environment of FIG. 1.

FIG. 2 illustrates an example method 200 to provide resiliency with a destination volume 108 in a replication environment 100 in accordance with this disclosure. This method covers establishing a new relationship including the destination volume, i.e., the new volume 108, replacing either the primary volume 104 or the secondary volume 106 in the established replication environment. Data from a source volume 104 or 106 is migrated to the destination volume at 202. A snapshot representing data on a volume 108, which matches the state of volumes 104 and 106, is generated at 204. The replication relationship between the source volumes 104 and 106 is broken at 206, and a new relationship between a source volume 104 or 106 and the destination volume 108 is established at 208. A delta of data between the snapshot and one of the volumes in the new relationship is generated at 210. The delta is sent to the other of the volumes in the new relationship at 212 to establish resilience for the data in the delta.

Figure 3:
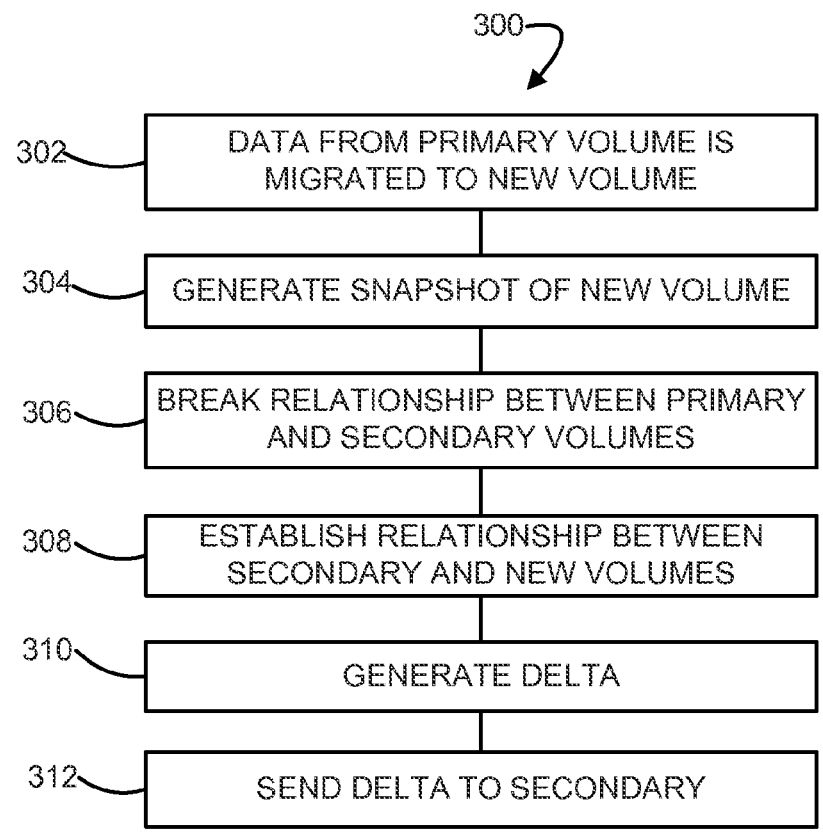
FIG. 3 is a block diagram illustrating an example of a method for providing resiliency with a destination volume when establishing a new primary volume in the replication environment of FIG. 1.

FIG. 3 illustrates an example method 300 for establishing a new primary volume in the replication environment 100. In this example method 300, the new volume 108 is used to replace the primary volume 104 and establish a relationship with the secondary volume 106. Data from the primary volume 104 is migrated to the destination volume, i.e. the new volume 108, at 302. A snapshot of the destination volume is generated at 304. The snapshot in this example represents data on a source volume 104 or 106 after the migration. The replication relationship between the primary volume 104 and the secondary volume 106 is broken at 306, and a replication relationship between the secondary volume 106 and the new volume 108 is established at 308. A delta of data between the snapshot and the current state of data on the destination volume is generated at 310 and sent to the secondary volume at 312 to reestablish resilience in the replication environment 100.

In one example of method 300 where the data on primary volume 104 is being migrated to the new volume 108, a snapshot $S_C$ of the data on the new volume 108 is generated at the point data ceases to be sent to primary volume 104 at the completion of the data migration. The snapshot $S_C$ in this example is representative of the data left behind on the primary volume 104 after migration has completed, and thus represents the data on the secondary volume 106, which is being synchronized with the primary volume 104 while the replication relationship between the primary and the secondary volumes 104, 106 is still intact. The replication relationship between primary and second volumes 104, 106 can then be broken, and a new relationship configured between the new volume 108 (now acting as a new primary volume) and the secondary volume 106 is established. At the point of establishing the new relationship, a delta is taken between the snapshot $S_C$ and the current state of the new volume 108, and this delta sent to the secondary volume 106, or written to the secondary volume 106, to re-establish resilience with all data between the new volume 108 and the secondary volume 106.

Figure 4:
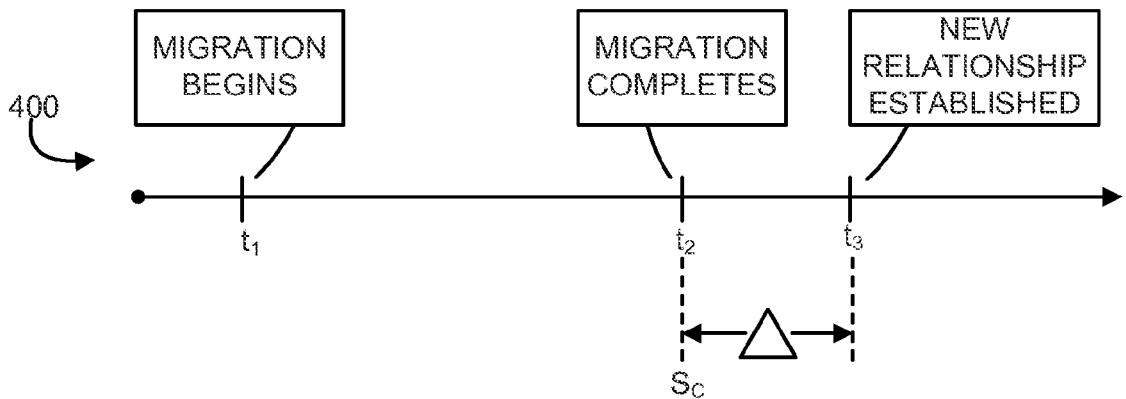
FIG. 4 is a schematic diagram illustrating an example timeline of the method of FIG. 3.

FIG. 4 illustrates a timeline 400 of an example of the method 300 where the new volume 108 is established as a new primary volume in the replication environment 100. Migration of data from the primary volume 104 to the new volume 108 begins at time $t_1$. The migration from the primary volume 104 to the new volume 108 completes at time $t_2$. At this point, the snapshot $S_C$ is taken of the data left on the primary volume 104, which can represent input/output activity on the primary volume 104 after migration begins to the time of the snapshot SC, such as time $t_2$. The relationship between the primary and the secondary volume 104, 106 is broken. A new relationship between the new volume 108 and the secondary volume 106 is established at time $t_3$. At this point, a delta is taken of the change in data on the new volume 108 and the snapshot $S_C$ that occurred between times $t_2$ and $t_3$, which represents the data not replicated in the replication environment. The delta is then sent to the secondary volume to reestablish resilience in the new replication relationship between the secondary volume 106 and the new volume 108.

Figure 5:
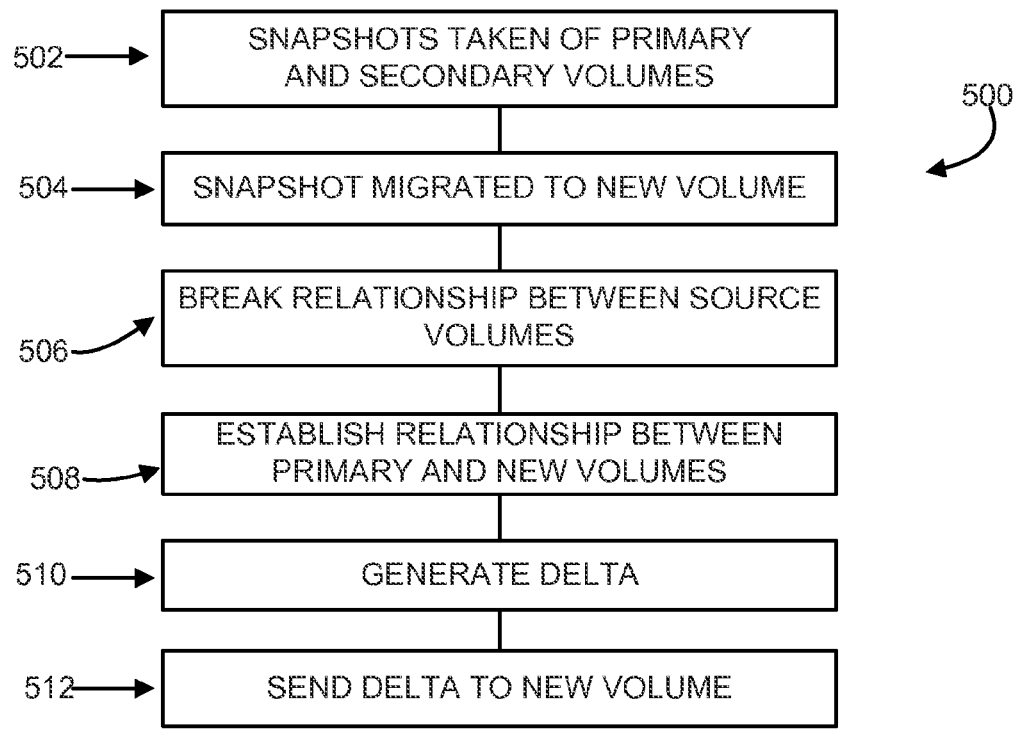
FIG. 5 is a block diagram illustrating an example of a method for providing resiliency with a destination volume when establishing a new secondary volume in the replication environment of FIG. 1.

FIG. 5 illustrates an example method 500 for establishing a new secondary volume in the replication environment 100. In this example method 500, the new volume 108 is used to replace the secondary volume 106 and establish a replication relationship with the primary volume 104. A snapshot of the source volumes representing data on a source volume, i.e., the primary volume 104 and the secondary volume 106, is coordinated and taken at 502.

The snapshot is migrated to the destination volume, i.e., the new volume 108, at 504. The replication relationship between the primary volume 104 and the secondary volume 106 is broken at 506, and a replication relationship between the primary volume 104 and the new volume 108 is established at 508. A delta of data between the snapshot and a current state of the primary volume 104 is generated at 510 and sent to the new volume 108 at 512 to reestablish resilience in the replication environment 100.

In one example of method 500 where the secondary volume 106 is being migrated to the new volume 108, a coordinated snapshot $S_A$ and $S_B$ of the volumes is taken across the primary and the secondary volumes 104, 106. The snapshot $S_B$ on the secondary volume 106 is then migrated to the new volume 108 with the existing replication relationship between the primary volume 104 and the secondary volume 106 left intact during migration. Once migration is complete the relationship between the primary and secondary volumes 104, 106 is broken. The snapshot $S_A$ taken of primary volume 104 now matches the copy of data that has been migrated to the new volume 108. A replication relationship between the primary volume 104 and the new volume 108 is established, and a delta is taken on the primary volume 104 between the snapshot $S_A$ and the current state of the primary volume 104. The delta is used to perform a fast resynchronization with new volume 108 to reestablish resilience with the primary volume 104.

Figure 6:
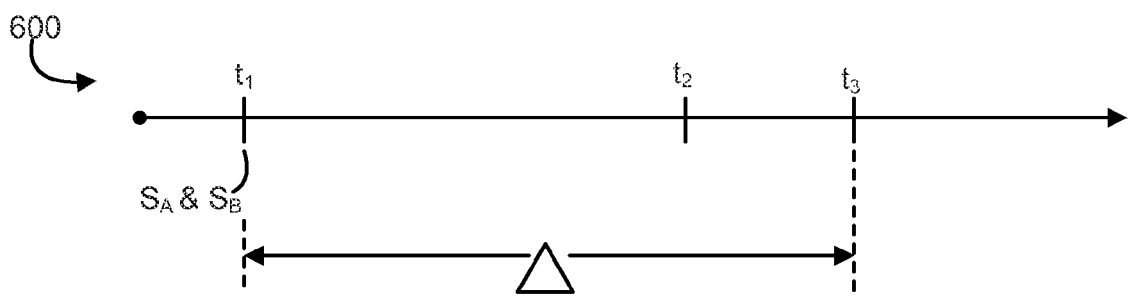
FIG. 6 is a schematic diagram illustrating an example timeline of the method of FIG. 5.

FIG. 6 illustrates a timeline 600 of an example of the method 500 where the new volume 108 is established as a new secondary volume in the replication environment 100. Snapshots $S_A$ and $S_B$ are taken at time $t_1$ when migration of data from the secondary volume 106 to the new volume 108 begins. Migration completes at time $t_2$. The relationship between the primary and the secondary volume 104, 106 is broken at time $t_2$. A new relationship between the new volume 108 and the primary volume 104 is established at time $t_3$. A delta is created between the data in snapshot $S_A$ and the current state of the primary volume 104, which represents the change of data on the primary volume 104 that occurred between times $t_1$ and $t_3$. Although the delta is taken over a longer period from, times $t_1$ to $t_3$, the time when primary volume 104 is not in a replication relationship is still times $t_2$ to $t_3$.

Figure 7:
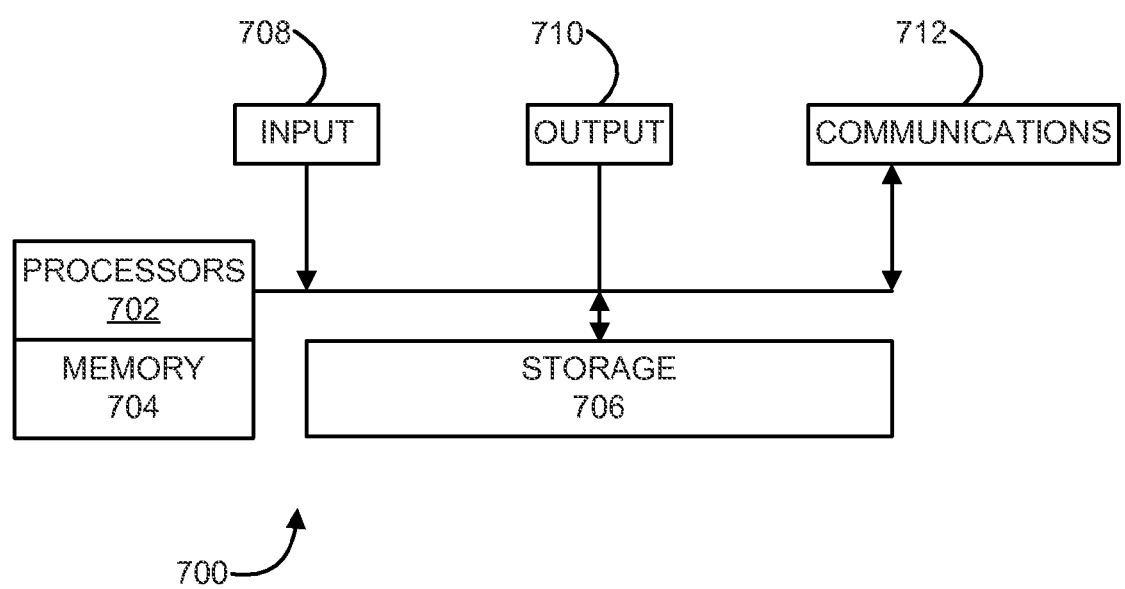
FIG. 7 is a block diagram illustrating an example of a computing device that can be employed to perform either of the example methods of FIG. 3 and FIG. 5 as part of the replication environment of FIG. 1.

FIG. 7 illustrates an exemplary computer system that can be employed to host or run a computer application included on one or more computer readable storage mediums storing computer executable instructions for controlling the computer system, such as a computing device, to perform the processes of the examples methods 200, 300, and 500 above. The exemplary computer system includes a computing device, such as computing device 700, which can also be included as part of the devices 104, 106, and 108 described above. The computing device 700 can take one or more of several forms. Such forms include a tablet, a personal computer, a workstation, a server, a handheld device, a consumer electronic device (such as a video game console), or other, and can be a stand-alone device or configured as part of a computer network, computer cluster, cloud services infrastructure, or other.

In a simple hardware configuration, computing device 700 typically includes a processor system having one or more processing units such as processors 702, and memory 704. The processing units may include two or more processing cores on a chip or two or more processor chips. In some examples, the computing device can also have one or more additional processing or specialized processors (not shown), such as a graphics processor for general-purpose computing on graphics processor units, to perform processing functions offloaded from the processor 702. The memory 704 may be arranged in a hierarchy and may include one or more levels of cache. Depending on the configuration and type of computing device, memory 704 may be volatile such as random access memory (RAM), non-volatile such as read only memory (ROM), flash memory, etc., or some combination of the two.

Computing device 700 may also include additional storage 706. Memory 704, and storage 706 are all examples of computer storage media. Examples of storage 706 include disk drives, optical drives, solid-state drives, and the like. Additionally, the computing device can be configured to accept memory cards, optical discs, and the like as storage 706. Computer storage media includes volatile and nonvolatile, removable and non-removable media implemented in any suitable method or technology for storage of information such as computer readable instructions, data structures, program modules or other data. Computer storage media includes RAM, ROM, EEPROM, flash memory or other memory technology, optical storage such as CD-ROM and digital versatile discs (DVD), magnetic storage devices such as magnetic tapes and magnetic disks, solid-state drives, flash storage devices such as universal serial bus (USB) flash drive and flash memory cards, or any other storage medium that can be used to store the desired information and that can be accessed by computing device 700. Any such computer storage media may be part of computing device 700.

Computing device 700 often includes one or more input and/or output connections, such as USB connections, display ports, proprietary connections, and others to connect with various devices to provide inputs and outputs to the computing device. Input devices 708 may include devices such as keyboard, pointing device such as a track pad and mouse, stylus, voice input device, touch input device, or other. Output devices 710 may include devices such as a display, speakers, printer, or the like.

Computing device 700 often includes one or more communication connections 712 that allow computing device 700 to communicate with other computers/applications. Example communication connections can include, an Ethernet interface, a wireless interface, a bus interface, a storage area network interface, a proprietary interface. The communication connections 712 can be used to couple the computing device 700 to a computer network, which can be classified according to a wide variety of characteristics such as topology, connection method, and scale. A computer network is a collection of computing devices and possibly other devices interconnected by communications channels that facilitates communications and allows sharing of resources and information among the interconnected devices. Examples of computer networks include a local area network, a wide area network, the Internet, or other network.

Although specific embodiments have been illustrated and described herein, it will be appreciated by those of ordinary skill in the art that a variety of alternate and/or equivalent implementations may be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. A method of providing resiliency with a destination volume of a plurality of volumes in a replication environment, the plurality of volumes further having a plurality of source volumes, the plurality of source volumes including a primary volume and at least one secondary volume which are in a replication relationship with each other, the method comprising:
   migrating data from the primary volume to the destination volume;
   upon completion of the migration of data from the primary volume to the destination volume, generating a snapshot of the destination volume representing data on the source volumes at completion of the migration;
   breaking the relationship between the primary volume and the at least one secondary volume after generating the snapshot whereupon sending of data to the primary volume is ceased and the destination volume is established as a new primary volume;
   establishing a new replication relationship between the at least one secondary volume and the new primary volume;
   upon establishment of the replication relationship between the new primary volume and the at least one secondary volume, generating a delta of data between the snapshot and the new primary volume; and
   sending the delta of data to the at least one secondary volume.

2. The method of claim 1 wherein the secondary volume is a backup volume to the primary volume.

3. The method of claim 1 wherein the destination volume and the source volumes each include storage arrays.

4. The method of claim 1 wherein the destination volume and the source volumes each include computing devices.

5. The method of claim 1, wherein data is not being replicated after breaking the relationship between the source volume and the at least one secondary volume prior to establishing the new relationship between the at least one secondary volume and the new primary volume.

6. The method of claim 1 wherein the plurality of volumes is three volumes.

7. A method of providing resiliency with a destination volume in a replication environment of a plurality of source volumes having a primary volume in a replication relationship with a secondary volume, the method comprising:
- migrating data from the primary volume to the destination volume;
- breaking the replication relationship between the primary volume and the secondary volume concurrent with completing migration of data from the primary volume to the destination volume;
- concurrent with breaking the replication relationship between the primary volume and the secondary volume, generating a snapshot on the destination volume representing data on the source volume, ceasing sending of data to the primary volume, and establishing the destination volume as a new primary volume;
- establishing a replication relationship between the secondary volume and the new primary volume;
- generating a delta of data between the snapshot and a current state of the destination volume after establishing the replication relationship between the secondary volume and the new primary volume; and
- sending data of the delta to the secondary volume.

8. The method of claim 7, wherein the snapshot on the destination volume represents data on the primary volume and secondary volume upon completion of the migration of data to the destination volume.

9. The method of claim 8 wherein the snapshot is representative of data being synchronized on the primary volume and secondary volume during migration until the relationship between the primary volume and the secondary volume is broken.

10. The method of claim 7 wherein the current state of the destination volume is representative of the data on the destination volume at the time of establishing the relationship between the secondary volume and the new primary volume.

11. The method of claim 7 wherein sending data of the delta to the secondary volume includes copying the data of the delta to the secondary volume.

12. A method of providing resiliency with a destination volume in a replication environment having a plurality of source volumes including a primary volume and at least one second volume in a replication relationship with the primary volume, the method comprising:
- taking a snapshot of one of the source volumes representing data on the source volumes simultaneously with beginning migrating data on one of the source volumes to the destination volume;
- breaking the replication relationship between the primary volume and the at least one secondary volume upon completion of the migrating data to the destination volume;
- establishing a replication relationship between the primary volume and the destination volume after upon breaking the replication relationship between the primary volume and the at least one secondary volume;
- generating a delta of data between the snapshot and a current state of the primary volume after upon establishing the replication relationship between the primary volume and the destination volume; and
- sending data of the delta to the destination volume.

13. The method of claim 12 wherein the destination volume becomes a new secondary volume when the relationship between the primary volume and the destination volume is established.

14. The method of claim 13 wherein migrating the snapshot to the destination volume includes migrating a snapshot of the secondary volume.

15. The method of claim 13 wherein generating a delta of data between the snapshot and a current state of the primary volume includes generating a delta of data between a snapshot of the primary volume.

16. The method of claim 15 wherein the delta represent the change of data on the primary volume between beginning the migration to the destination volume and establishing the replication relationship between the primary volume and the destination volume.

* * * * *